Patented Nov. 5, 1935

2,020,251

UNITED STATES PATENT OFFICE 2,020,251

PROPIONIC ACID FERMENTATION PROCESS

Hugh R. Stiles, Terre Haute, Ind., assignor to Commercial Solvents Corporation, Terre Haute, Ind., a corporation of Maryland No Drawing. Application June 29, 1932,
Serial No. 619,965

16 Claims. (Cl. 260—120)

The present invention relates to a process for the production of propionic acid by the fermentation of carbohydrate mashes. More particularly, the present invention relates to an improvement in the propionic acid fermentation which comprises carrying out said fermentation in the presence of certain catalytic agents.

The propionic acid fermentation, as previously carried out, has been unsatisfactory from a commercial standpoint in a number of respects. The yields obtained have been relatively low and the fermentation has, in most cases, been too slow for practical purposes. United States Patent No. 1,459,959 of Sherman et al., discloses a method for accelerating this fermentation by means of lactic acid organisms and certain other bacteria. However, even with this improvement, the fermentation has been undesirably slow and the yields have not been greatly improved.

While catalytic agents are well known in chemistry, their use in the fermentation field has been practically negligible. The catalytic effect of symbiotic action of bacteria has been utilized, and minute quantities of certain soluble substances have been found to have a beneficial effect upon certain fermentations. However, solid contact agents, such as are generally employed in chemical catalysis, have not thus far been utilized in the fermentation field. Certain solid supporting media have been used, for example, the wood shavings employed in the "quick vinegar" process. However, these materials merely serve to retain the bacteria and do not have any specific catalytic effect upon the fermentation.

The surprising discovery has now been made that a definite catalytic effect upon the propionic acid fermentation is secured by including in the media certain solid contact agents. The agents which have been found to be suitable for this purpose are the clays known as "bentonites" and the hydrous aluminium oxides. Of the latter compounds, it is preferred to use the partially dehydrated products known as "activated alumina". Particularly adapted to the present process are a grade of bentonite known as "bentonite B" and an activated alumina known as "1228 G".

Bentinite B is a grade of clay having the following approximate composition:

| | Per cent |
|---|---|
| $SiO_2$ | 58.0 |
| $Al_2O_3$ | 19.9 |
| $Fe_2O_3$ | 2.9 |
| $MgO$ | 2.6 |
| $Na_2O$ | 2.3 |
| Ignition loss | 8.1 |

Activated alumina 1228 G is a partially dehydrated alumina trihydrate which has an approximate specific gravity of 3.25, is granular in form, and very resistant to crushing and abrasion. Its approximate analysis is as follows:

| | Per cent |
|---|---|
| $SiO_2$ | 0.08 |
| $Al_2O_3$ | 91.23 |
| $Fe_2O_3$ | 0.01 |
| $TiO_2$ | 0.01 |
| $Na_2O$ | 1.27 |
| Ignition loss | 7.10 |

Although both of these types of catalysts give eminently satisfactory results, it is preferred to use the activated alumina type since it is somewhat more active catalytically and also since it has a greater apparent density, thus taking up less space in the fermentation vessel. This latter quality makes activated alumina more desirable from the standpoint of recovering the fermented mash since there will be less absorbed upon the solid material. Likewise, if it should be desired to operate the fermentation in a semi-continuous manner more of the fermented liquid can be withdrawn at each draw-off when activated alumina is used as the catalyst.

The use of these materials is adapted to fermentations by means of any of the known types of propionic acid bacteria, for example those described in The Propionic Acid Bacteria, C. B. Van Niel, N. V. Uitgeverszaak J. W. Boissevain & Co. Haarlem, 1928. Especially suited for this purpose is bacterium acidi propionici, an organism isolated from Swiss cheese; and various strains of this organism may be employed, as for example, bacterium acidi propionici, bacterium acidi propionici strain "a", strain "b", strain "c", strain "d", or strain "rubrum".

In addition to the proponic acid bacteria, there may be employed known accelerating organisms such as those disclosed in United States Patent No. 1,459,959 of Sherman et al. For example there may be used: 1. Those organisms which produce lactic acid from carbohydrates, as for example, those described on pages 241-255 of Bergey's Manual of Determinative Bacteriology (1923 edition); 2. Organisms which hydrolyze nitrogenous substances and form therefrom new materials which can be acted upon by other bacteria such as the members of the Proteus group (pages 209-211 of Bergey's Manual of Determinative Bacteriology); 3. Organisms which do not fall into either of the preceding groups but which ferment salts of organic acids such as the members of the Alcaligines group (pages 233-237 of Bergey's Manual of Determinative Bacteriology).

The present process is particularly adapted to be employed in conjunction with the process described in co-pending patent application Serial No. 619,964 filed June 29, 1932 by H. R. Stiles, now Patent No. 1,946,447, dated Feb. 6, 1934. According to the method of this application, fructose-containing mashes are subjected to the action of mannitol-forming bacteria and lactic acid bacteria, and the resulting, at least partially fermented, mash is subjected to the action of propionic acid bacteria. The mannitol-forming bacteria for this process may be of any of the known types, such as for example, bacterium mannitopoeum, bacillus gayoni, and lactobacillus fermentum, or any of the organisms described in Fermentation Products of Certain Mannitol-Forming Bacteria, H. R. Stiles et al., Journal of Biological Chemistry 64, 643, 1925. The lactic acid bacteria may also be any of the known types such as those included in group 1 above. This fermentation may be carried out by either the simultaneous or successive inoculation with the mannitol and lactic organisms and the propionic acid organisms. Thus, the fermentation with the mannitol and lactic organisms may be allowed to go to completion before inoculating with the propionic acid bacteria, or the fermentation may be accomplished by the simultaneous action of all three types of bacteria. The present process is particularly applicable to the latter method of fermentation.

Aside from the presence of the catalytic agents referred to, the mashes used in the present process may be of any type known to be suitable for the particular type of propionic acid fermentation employed. Thus, if the ordinary propionic acid fermentation or the process of United States Patent No. 1,459,959 referred to above, are utilized, practically any soluble carbohydrate may be employed, such as for example, glucose, maltose, lactose, "hydrol" (the molasses obtained in the corn sugar industry), hydrolyzed grain, and the like. If the process of co-pending application Serial No. 619,964 is employed, mashes should be used which contain soluble carbohydrate of which 25% is fructose or its equivalent in the form of fructose-yielding carbohydrates such as sucrose, raffinose, gentianose, inversion products of these sugars such as the commonly known "invert sugar" from sucrose, molasses, inverted molasses, hydrolyzed inulin, Jerusalem artichoke tubers, and the like.

Known nutrients such as soluble nitrogen in the form of yeast water, steep water, butyl-acetonic slop or distillery wastes from other fermentation industries may be employed. The hydrogen ion concentration may be maintained within the same limits as suitable for the fermentation by propionic acid bacteria alone, e. g., a pH of 5.4-6.0, the pH maintained by an excess of calcium carbonate in the medium. The fermentation temperature may likewise be maintained within the limits known to be operative for the propionic fermentation. The preferred temperature, however, is 30-31° C. In all other respects, such as the mechanical steps in carrying out the fermentation, the known methods for the propionic acid fermentation may be employed.

In any of the above type of mashes, the agents may be employed in concentrations of from 0.5 to 5% by weight of the mash, but are preferably used in concentrations of from 1 to 3%. This material may, of course, be added to the sterilized mash in a sterile condition, but it is more conveniently added to the mash before sterilization in the ordinary manner.

The present invention may perhaps best be illustrated by the following specific examples:

Example I

A mash containing 7% of hydrolyzed corn, (i. e., approximately 5% total sugar), 0.6% of steep water (dry basis), 3% of calcite and 3% of activated alumina is inoculated with approximately 5% of a culture containing 90% propionic acid bacteria and 10% lactic acid bacteria and the fermentation is allowed to proceed at 30° C. in the usual manner for the propionic acid fermentation.

Example II

A mash containing 10% of molasses (i. e., approximately 5% total sugar), 0.6% of steep water (dry basis), 3% of calcite and 3% of bentonite B is inoculated with about 2% by volume of a culture containing approximately 90% propionic acid bacteria, 5% mannitol-forming bacteria, and 5% lactic acid bacteria. The fermentation is allowed to proceed at 30° C. in the usual manner for the propionic acid fermentation.

Example III

A mash of inverted molasses diluted with butyl-acetonic slop to a concentration of about 10%, (i. e. approximately 5% of invert sugar), containing 3% of calcite and 3% of activated alumina is inoculated with 2% of a culture containing approximately 50% of mannitol-forming bacteria and approximately 50% of lactic acid bacteria. The fermentation is allowed to go to completion and the resulting mash is then inoculated with propionic acid bacteria. The fermentation is then allowed to continue in the usual manner for the propionic acid fermentation.

The fermentation may of course, if desired, be carried out in a continuous or semi-continuous manner, as well as by the usual batch process of the above examples. The following example illustrates a method for carrying out the fermentation in a semi-continuous manner:

Example IV

A mash containing approximately 10% of inverted molasses, (i. e. approximately 5% invert sugar), 0.6% of steep water (dry basis), 3% of calcite and 3% of bentonite.B is inoculated with a mixed culture containing approximately 90% of propionic acid bacteria in the form of a culture containing bacterium acidi propionici, bacterium acidi propionici strain "b", strain "c", or strain "rubrum", approximately 5% of lactobacillus casei and approximately 5% of lactobacillus fermentum. The fermentation is allowed to proceed at 30° C. for seven days at which time the fermented mash is allowed to settle, 50% of the mash is withdrawn, preferably from the top of the vessel, and an equal portion of fresh mash is introduced. In this manner a semi-continuous fermentation may be carried out indefinitely so long as contamination or other difficulties are not encountered.

The results in the following table show the beneficial results secured by the use of these catalytic agents. Other solid contact materials were employed in fermentations carried out in parallel with the alumina and bentonite fermentation. One fermentation contained no contact agent and the others contained one and 3% respectively, of activated alumina, bentonite B and silica gel. The medium employed contained 10% of molasses, approximately 0.6% butylacetonic slop (dry basis) and 5% of calcite. A mixed culture of propionic acid bacteria, mannitol-forming organisms, and lactic acid bacteria was used. The media were sterilized for one hour at 20 lbs. pressure. The fermentations were carried out at 30° C., were thoroughly agitated once each day, and yields were determined at 9, 12 and 15 days.

TABLE I

| Contact agent | Volatile acid | Propionic acid | Lactic acid | Sugar left | Alcohol |
|---|---|---|---|---|---|
| *Results after 9 days* | | | | | |
| | G/100 cc. | Percent of total | G/100 cc. | G/100 cc. | G/liter |
| None | 1.48 | 56 | 2.56 | 0.33 | |
| 1% Act. alumina | 2.36 | 63 | 1.57 | 0.31 | |
| 1% Bentonite B | 1.84 | 58 | 1.97 | 0.29 | |
| 1% Silica gel | 1.45 | 56 | 2.53 | 0.31 | |
| 3% Act. alumina | 3.22 | 70 | 1.20 | 0.34 | |
| 3% Bentonite B | 2.37 | 64 | 1.57 | 0.32 | |
| 3% Silica gel | 2.15 | 61 | 1.69 | 0.32 | |
| *Results after 12 days* | | | | | |
| None | 2.18 | 63 | 1.88 | 0.28 | |
| 1% Act. alumina | 3.12 | 67 | 0.93 | 0.28 | |
| 1% Bentonite B | 2.58 | 67 | 1.40 | 0.25 | |
| 1% Silica gel | 2.12 | 64 | 1.84 | | |
| 3% Act. alumina | 3.22 | 68 | 0.88 | 0.25 | |
| 3% Bentonite B | 2.92 | 67 | 1.04 | 0.31 | |
| 3% Silica gel | 2.22 | 67 | 1.74 | 0.23 | |
| *Results after 15 days* | | | | | |
| None | 2.83 | 67 | | 0.32 | 6.3 |
| 1% Act. alumina | 3.47 | 69 | 0.57 | 0.31 | 5.9 |
| 1% Bentonite B | 3.22 | 67 | 0.92 | 0.29 | 5.9 |
| 1% Silica gel | 2.80 | 66 | 1.24 | 0.33 | 5.6 |
| 3% Act. alumina | 3.55 | 69 | 0.61 | 0.32 | 5.0 |
| 3% Bentonite B | 3.41 | 70 | 0.78 | 0.33 | 4.8 |
| 3% Silica gel | 2.94 | 68 | 1.07 | 0.32 | 5.0 |

The following experiment, carried out in a semi-continuous manner, also illustrates the improved results secured by the use of the catalytic agents and shows the particular advantage secured by the use of these agents in the mannitol type fermentation. The fermentation medium employed was the same as in the above experiment and the same conditions were utilized with the exception that at the end of every seven days, 50% of the fermented mash was withdrawn and was replaced by an equal volume of fresh mash. The results are given below.

TABLE II

| Contact agent | Volatile acid | Propionic acid | Lactic acid | Sugar left | Alcohol |
|---|---|---|---|---|---|
| *Results of 1st draw off* | | | | | |
| | G/100 cc. | Percent of total | G/100 cc. | G/100 cc. | G/liter |
| 3% Silica gel | 1.25 | 49 | 3.10 | 0.38 | 6.9 |
| 3% Act. alumina | 1.56 | 57 | 2.39 | 0.21 | 5.9 |
| 3% Kieselguhr | 1.33 | 51 | 2.72 | 0.26 | 7.1 |
| 3% Bentonite B | 1.46 | 55 | 3.02 | 0.26 | 8.0 |
| *Results of 2nd draw off* | | | | | |
| 3% Silica gel | 2.40 | 63 | 2.01 | 0.34 | 6.6 |
| 3% Act. alumina | 3.36 | 67 | 1.04 | 0.28 | 5.2 |
| 3% Kieselguhr | 2.57 | 62 | 1.67 | 0.29 | 6.4 |
| 3% Bentonite B | 2.90 | 66 | 1.51 | 0.31 | 5.6 |
| *Results of 3d draw off* | | | | | |
| 3% Silica gel | 2.59 | 64 | 1.47 | 0.32 | 4.5 |
| 3% Act. alumina | 3.50 | 69 | 0.85 | 0.25 | 3.3 |
| 3% Kieselguhr | 3.09 | 70 | 0.93 | 0.31 | 3.6 |
| 3% Bentonite B | 3.25 | 70 | 0.79 | 0.29 | 3.4 |

As may be noted from the above table, when the catalytic agents of the present invention were employed, not only were the yields improved but also the ratio of propionic acid was increased and the amount of undesired alcohol was decreased. In this type of fermentation, in the presence of both fructose and glucose types of carbohydrates, the lactic acid bacteria apparently preferentially attack the glucose and the mannitol bacteria preferentially attack the fructose. This is illustrated by the improved results obtained according to the process of co-pending application Ser. No. 619,964 in which these organisms are employed without the use of catalytic agents. However, as may be seen from the above table, the catalytic agents apparently exert a directing influence upon this fermentation and secure even a further preferential attack upon the carbohydrates, thus securing not only the improved yields obtained in the ordinary propionic fermentation, but also the added advantage of a higher ratio of propionic acid in the products.

It is to be distinctly understood that the above examples are merely illustrative of the present invention and that the invention is not to be taken as limited to the particular processes described. Neither is the invention to be limited to the particular strains of bacteria or the particular types of raw materials specified. Equivalents which would naturally occur to one skilled in the art may be employed without departing from the spirit of the invention.

The invention now having been described, what is claimed is:

1. In a process for the production of propionic acid by fermentation, the step which comprises carrying out said fermentation in the presence of a catalytic agent chosen from the group consisting of bentonite clays and hydrous aluminium oxides.

2. In a process for the production of propionic acid by fermentation of a mash containing soluble carbohydrate material of at least 25% fructose equivalent by means of the simultaneous action of mannitol-forming bacteria, lactic acid bacteria and propionic acid bacteria, the step which comprises carrying out said fermentation in the presence of a catalytic agent chosen from the group consisting of bentonite clays and hydrous aluminium oxides.

3. In a process for the production of propionic acid by fermentation, the step which comprises carrying out said fermentation in the presence of activated alumina comprising essentially partially dehydrated aluminium trihydrate.

4. In a process for the production of propionic acid by fermentation, the step which comprises carrying out said fermentation in the presence of 1 to 3% of bentonite clay of the following approximate composition:

|  | Percent |
|---|---|
| $SiO_2$ | 58.0 |
| $Al_2O_3$ | 19.9 |
| $Fe_2O_3$ | 2.9 |
| $MgO$ | 2.6 |
| $Na_2O$ | 2.3 |
| Ignition loss | 8.1 |

5. In a process for the production of propionic acid by fermentation of a mash containing soluble carbohydrate material of at least 25% fructose equivalent by means of the simultaneous action of mannitol-forming bacteria, lactic acid bacteria and propionic acid bacteria, the step which comprises carrying out said fermentation in the presence of bentonite clay of the following approximate composition:

|  | Percent |
|---|---|
| $SiO_2$ | 58.0 |
| $Al_2O_3$ | 19.9 |
| $Fe_2O_3$ | 2.9 |
| $MgO$ | 2.6 |
| $Na_2O$ | 2.3 |
| Ignition loss | 8.1 |

6. In a process for the production of propionic acid by fermentation of a mash containing soluble carbohydrate material of at least 25% fructose equivalent by means of the simultaneous action of mannitol-forming bacteria, lactic acid bacteria and propionic acid bacteria, the step which comprises carrying out said fermentation in the presence of 1 to 3% of bentonite clay of the following approximate combination.

|  | Percent |
|---|---|
| $SiO_2$ | 58.0 |
| $Al_2O_3$ | 19.9 |
| $Fe_2O_3$ | 2.9 |
| $MgO$ | 2.6 |
| $Na_2O$ | 2.3 |
| Ignition loss | 8.1 |

7. In a process for the production of propionic acid by fermentation, the step which comprises carrying out said fermentation in the presence of a partially dehydrated hydrous aluminium oxide.

8. In a process for the production of propionic acid by fermentation, the step which comprises carrying out said fermentation in the presence of 1 to 3% of a partially dehydrated hydrous aluminium oxide.

9. In a process for the production of propionic acid by fermentation of a mash containing soluble carbohydrate material of at least 25% fructose equivalent by means of the simultaneous action of mannitol-forming bacteria, lactic acid bacteria, and propionic acid bacteria, the step which comprises carrying out said fermentation in the presence of 1 to 3% of a partially dehydrated hydrous aluminium oxide.

10. In a process for the production of propionic acid by fermentation, the step which comprises carrying out said fermentation in the presence of a bentonite clay having an $Al_2O_3$ content of about 20%.

11. In a process for the production of propionic acid by fermentation, the step which comprises carrying out said fermentation in the presence of 1 to 3% of bentonite clay.

12. In a process for the production of propionic acid by fermentation of a mash containing soluble carbohydrate material of at least 25% fructose equivalent by means of the simultaneous action of mannitol-forming bacteria, lactic acid bacteria, and propionic acid bacteria, the step which comprises carrying out said fermentation in the presence of 1 to 3% of bentonite clay.

13. In a process for the production of propionic acid by fermentation, the step which comprises carrying out said fermentation in the presence of activated alumina of the following approximate composition:

|  | Per cent |
|---|---|
| $SiO_2$ | 0.08 |
| $Al_2O_3$ | 91.23 |
| $Fe_2O_3$ | 0.01 |
| $TiO_2$ | 0.01 |
| $Na_2O$ | 1.27 |
| Ignition loss | 7.10 |

14. In a process for the production of propionic acid by fermentation, the step which comprises carrying out said fermentation in the presence of 1 to 3% of activated alumina of the following following approximate composition:

|  | Per cent |
|---|---|
| $SiO_2$ | 0.08 |
| $Al_2O_3$ | 91.23 |
| $Fe_2O_3$ | 0.01 |
| $TiO_2$ | 0.01 |
| $Na_2O$ | 1.27 |
| Ignition loss | 7.10 |

15. In a process for the production of propionic acid by fermentation of a mash containing soluble carbohydrate material of at least 25% fructose equivalent by means of the simultaneous action of mannitol-forming bacteria, lactic acid bacteria, and propionic acid bacteria, the step which comprises carrying out said fermentation in the presence of activated alumina of the following approximate composition:

| | Per cent |
|---|---|
| $SiO_2$ | 0.08 |
| $Al_2O_3$ | 91.23 |
| $Fe_2O_3$ | 0.01 |
| $TiO_2$ | 0.01 |
| $Na_2O$ | 1.27 |
| Ignition loss | 7.10 |

16. In a process for the production of propionic acid by fermentation of a mash containing soluble carbohydrate material of at least 25% fructose equivalent by means of the simultaneous action of mannitol-forming bacteria, lactic acid bacteria, and propionic acid bacteria, the step which comprises carrying out said fermentation in the presence of 1 to 3% of activated alumina of the following approximate composition:

| | Per cent |
|---|---|
| $SiO_2$ | 0.08 |
| $Al_2O_3$ | 91.23 |
| $Fe_2O_3$ | 0.01 |
| $TiO_2$ | 0.01 |
| $Na_2O$ | 1.27 |
| Ignition loss | 7.10 |

HUGH R. STILES.